US009600536B1

United States Patent
Atar et al.

(10) Patent No.: US 9,600,536 B1
(45) Date of Patent: Mar. 21, 2017

(54) DETERMINING DISCREPANCY CAUSES IN A COMPUTERIZED ACCOUNTING SYSTEM

(71) Applicant: R-Way Applications Ltd., Modiin (IL)

(72) Inventors: Noam Atar, Modiin (IL); Svetlana Birman, Zoran Kadima (IL)

(73) Assignee: R-WAY APPLICATIONS LTD., Modiin (IL)

( * ) Notice: Subject to any disclaimer, the term of this patent is extended or adjusted under 35 U.S.C. 154(b) by 458 days.

(21) Appl. No.: 14/306,547

(22) Filed: Jun. 17, 2014

Related U.S. Application Data (60) Provisional application No. 61/835,772, filed on Jun. 17, 2013.

(51) Int. Cl.
G06F 17/30 (2006.01)

(52) U.S. Cl.
CPC .............. G06F 17/30533 (2013.01)

(58) Field of Classification Search
None
See application file for complete search history.

(56) References Cited

U.S. PATENT DOCUMENTS

| 8,046,277 | B2 | 10/2011 | Zhu et al. | |
|---|---|---|---|---|
| 8,156,143 | B2 | 4/2012 | Hotz | |
| 8,332,286 | B1 | 12/2012 | Lopes | |
| 2009/0157689 | A1* | 6/2009 | Hotz | G06Q 10/06 |
| 2010/0332360 | A1* | 12/2010 | Nowotny | G06Q 10/10 |
| | | | | 705/30 |
| 2014/0032427 | A1* | 1/2014 | Gannon | G06Q 50/182 |
| | | | | 705/309 |

* cited by examiner

*Primary Examiner* — Anh Tai Tran
(74) *Attorney, Agent, or Firm* — Roach Brown McCarthy & Gruber, P.C; Kevin D. McCarthy (57) ABSTRACT

A method determining one or more causes for discrepancies in a computerized accounting system, the method comprising using at least one hardware processor for: providing a set of theoretical causes for discrepancies between sub-ledgers of an ERP (Enterprise Resource Planning) system and a general ledger of the ERP system; providing a set of database queries corresponding to the theoretical causes in the set of theoretical causes; executing the database queries of the a set of database queries in the ERP system; receiving a set of responses to the database queries; and based on the set of responses, refuting or confirming each of the theoretical causes of the set of theoretical causes.

20 Claims, 4 Drawing Sheets

| Reconciliation Type | Acc. | Descr. of Account | GL Period | GL Date | Entity | Event | Trans. Number | Accounting Class | GL Trans. Stat. | Journal Category | Supplier Name | Supplier Number | Curr. | Amount | Functional Amount USD |
|---|---|---|---|---|---|---|---|---|---|---|---|---|---|---|---|
| AP Trial Balance | 2151207 | Other Accounts Pay. - Pensions funds in AP | AUG-13 | 07-Aug-2013 | AP_INVOICES | Invoices | 6456 | Item Expense | Y | Purchase Invoices | PENSION FUND GAON | 14875 | ILS | 504.28 | 141.93 |
| AP Trial Balance | 2151207 | Other Accounts Pay. - Pensions funds in AP | AUG-13 | 07-Aug-2013 | AP_INVOICES | Invoices | 8799 | Item Expense | Y | Purchase Invoices | DIR.INSURANCE - KLAL | 12547 | ILS | 660.44 | 185.88 |
| AP Trial Balance | 2151207 | Other Accounts Pay. - Pensions funds in AP | SEP-13 | 02-Sep-2013 | AP_INVOICES | Invoices | 0678 | Item Expense | Y | Purchase Invoices | DIR.INSURANCE - KLAL | 12547 | ILS | 662.36 | 183.28 |
| AP Trial Balance | 2151207 | Other Accounts Pay. - Pensions funds in AP | SEP-13 | 02-Sep-2013 | AP_INVOICES | Invoices | 7890 | Item Expense | Y | Purchase Invoices | PENSION FUND GAON | 14875 | ILS | 504.28 | 139.54 |
| AP Trial Balance | 2151207 | Other Accounts Pay. - Pensions funds in AP | OCT-13 | 05-Oct-2013 | AP_INVOICES | Invoices | 6758 | Item Expense | Y | Purchase Invoices | PENSION FUND GAON | 14875 | ILS | 372.80- | 105.10- |
| AP Trial Balance | 2151207 | Other Accounts Pay. - Pensions funds in AP | OCT-13 | 05-Oct-2013 | AP_INVOICES | Invoices | 6758 | Item Expense | Y | Purchase Invoices | PENSION FUND GAON | 14875 | ILS | 372.80 | 105.10 |
| | | | | | | | | | | | | | | 2,331.36 | 650.63 |

Fig. 4

DETERMINING DISCREPANCY CAUSES IN A COMPUTERIZED ACCOUNTING SYSTEM

FIELD OF THE INVENTION

The invention relates to the field of computerized accounting systems.

BACKGROUND

Many companies in the business world use the accrual-based accounting method. When goods are purchased and received, the accrual account is credited. When an invoice is received that is matched to a Purchase Order (or "PO"), the accrual account is debited for the amount invoiced. If all the receipts and invoices for purchase orders are perfectly matched, the accrual account balance should be zero. These accrual accounts must be reconciled and maintained to ensure that liabilities are properly recorded. The accrual account balance may not be zero due to various business problems (over-receipt, over-invoice, invoice not matched to PO, etc). Under such circumstances, the balance in the accrual account must be written-off so that the company's financials can be correctly stated.

Account reconciliation is an accounting process utilized to verify the accuracy of a ledger account balance and its accounting entries. Account reconciliation may involve a post-fact inspection process because the accounting events have already happened. Account reconciliation may enable the finance personnel to manage any outstanding items. The outstanding items are accounting entries that currently compose the ledger account balance. In order to control the outstanding items, account reconciliation may use a reconciliation sheet to provide a detailed analysis of all accounting entries that are part of a ledger account.

U.S. Pat. No. 8,046,277 to Zhu et al. discloses a computer-implemented method of managing reconciliation and write-off data in an accrual-based accounting environment, which may include steps of retrieving a plurality of transactions associated with a predetermined purchase order from a database coupled to a computer network; calculate an aggregate accrual balance of the retrieved plurality of transactions and associate the calculated aggregate accrual balance with a unique first identifier; when the aggregate accrual balance associated with the unique first identifier indicates that the predetermined purchase order is unbalanced, loading a first reconciliation table with first reconciliation information and storing the first reconciliation table in the database; enable writing-off the aggregate accrual balance, and when the aggregate accrual balance has been written-off, remove the first reconciliation information from the first reconciliation table and store the first reconciliation table in the database.

U.S. Pat. No. 8,156,143 to Hotz discloses a system and method to reconcile Human Resource databases, including payroll, accounting, tax and travel databases, are provided. The system and method may include a database aggregation component that automatically gathers and stores a plurality of databases in a corporation business information system wherein these databases may be logically related to each other and a database reconciliation component that is capable of querying a database for retrieving data entries based on user instructions or on requests automatically generated according to preset conditions. The reconciliation method may further compare data from logically related databases. If discrepancies exist in a comparison result, the method may provide a drill-down step where data at next level of detail may be retrieved according to automatically generated queries. This reconciliation process of comparison and drill-down for more detail may continue until a preset condition is satisfied or there is no further detail to retrieve. The system may produce a report relating to the reconciliation results.

U.S. Pat. No. 8,332,286 to Lopes discloses a system and method for a comprehensive account reconciliation process, which ensures a predictable level for the accuracy of the ledger account balance. The present account reconciliation process includes nine reconciliation methods both transactional and non-transactional. The account reconciliation processes are part of overall accounting accuracy methodology that includes five macro processes where reconciliation takes place during the execute macro process. The reconciliation methods cover the diverse interactions between the ledger accounts and supporting documents that are either externally or internally generated.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method determining one or more causes for discrepancies in a computerized accounting system, the method comprising using at least one hardware processor for: providing a set of theoretical causes for discrepancies between sub-ledgers of an ERP (Enterprise Resource Planning) system and a general ledger of the ERP system; providing a set of database queries corresponding to the theoretical causes in the set of theoretical causes; executing the database queries of the a set of database queries in the ERP system; receiving a set of responses to the database queries; and based on the set of responses, refuting or confirming each of the theoretical causes of the set of theoretical causes.

There is further provided, in accordance with an embodiment, a computer program product for determining one or more causes for discrepancies in a computerized accounting system, the computer program product comprising a non-transitory computer-readable storage medium having program code embodied therewith, the program code executable by at least one hardware processor to: provide a set of theoretical causes for discrepancies between sub-ledgers of an ERP (Enterprise Resource Planning) system and a general ledger of the ERP system; provide a set of database queries corresponding to the theoretical causes in the set of theoretical causes; execute the database queries of the a set of database queries in the ERP system; receive a set of responses to the database queries; and based on the set of responses, refute or confirm each of the theoretical causes of the set of theoretical causes.

There is further provided, in accordance with an embodiment, an apparatus comprising: a non-transient memory having stored thereon: (a) a set of theoretical causes for discrepancies between sub-ledgers of an ERP (Enterprise Resource Planning) system and a general ledger of the ERP system, and (b) a set of database queries corresponding to the theoretical causes in the set of theoretical causes; and a hardware processor configured to: (c) execute the database queries of the a set of database queries in the ERP system, (d) receive a set of responses to the database queries, and (e) based on the set of responses, refute or confirm each of the theoretical causes of the set of theoretical causes.

In some embodiments, said set of theoretical causes of discrepancies comprises sub-sets of theoretical causes of discrepancies unique to said general ledger, and said executing of the database queries of the set of database queries comprises executing sub-sets of database queries unique to said general ledger.

In some embodiments, said set of theoretical causes of discrepancies comprises sub-sets of theoretical causes of discrepancies unique to each of said sub-ledgers, and said executing of the database queries of the set of database queries comprises executing sub-sets of database queries unique to each of said sub ledgers.

In some embodiments, the method further comprises using said at least one hardware processor for generating, based on the set of responses, a report comprising confirmed ones of said causes, each represented by one or more transactions comprised in the set of responses to the database queries.

In some embodiments, said hardware processor configured to generate, based on the set of responses, a report comprising confirmed ones of said causes, each represented by one or more transactions comprised in the set of responses to the database queries.

In some embodiments, said report further comprises a magnitude of discrepancy for each of said confirmed ones of said causes.

In some embodiments, the magnitude of discrepancy is expressed by a monetary amount.

In some embodiments, said report further comprises a consolidated magnitude of all of said discrepancies.

In some embodiments, said program code is further executable by said at least one hardware processor to generate, based on the set of responses, a report comprising confirmed ones of said causes.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

A method for computerized querying, reporting and explaining discrepancies between sub ledgers and a general ledger is disclosed herein.

Nowadays, a significant portion of organizations utilize computerized systems to manage their accounting. However, these systems still allow discrepancies between ledgers (e.g. caused by a manual entry), and thus require a reconciliation process.

The reconciliation process may be performed by every organization periodically (once in a quarter, month, etc.), and usually provides only an aggregated discrepancy magnitude. Finding the reason for each discrepancy may consume a lot of resources, such as manpower, time, etc. Some organizations may not even investigate it at all. Furthermore, if a number of discrepancies cancel each other out (such as if two discrepancies are of the same monetary amount but with opposite signs), the organization may not even know that such discrepancies exist. Thus, a computerized method for reporting and explaining discrepancies between sub ledgers and a general ledger may be highly advantageous.

The following discussions may be better understood by a review of some examples of discrepancies between an AP (Accounts Payable) sub-ledger and a general ledger (wherein Dr=debit and Cr=credit):

Normal Situation:

Supplier Invoice #1 amount is 100 USD, it is partially paid by Payment #1 with 60 USD.

AP Trial Balance=100−60=40 USD

GL (General Ledger) entries:

|  | Liability | | Expense | | Cash | |
| --- | --- | --- | --- | --- | --- | --- |
|  | Dr | Cr | Dr | Cr | Dr | Cr |
| Invoice #1 |  | 100 | 100 |  |  |  |
| Payment #1 | 60 |  |  |  |  | 60 |
| Balance |  | 40 | 100 |  |  | 60 |

Result:

| AP Trial Balance | GL Credit Balance of AP Liability account | Difference |
| --- | --- | --- |
| 40 | 40 | 0 |

Discrepancy 1:

Create manual journal entry of 20 USD for the AP Liability account in general ledger. This entry is accidently not registered in the AP sub ledger.

AP Trial Balance=100−60=40 USD

GL (General Ledger) entries:

|  | Liability | | Expense | | Cash | |
| --- | --- | --- | --- | --- | --- | --- |
|  | Dr | Cr | Dr | Cr | Dr | Cr |
| Invoice #1 |  | 100 | 100 |  |  |  |
| Payment #1 | 60 |  |  |  |  | 60 |

-continued

| | | | | | |
|---|---|---|---|---|---|
| Manual entry | 20 | | 20 | | |
| Balance | | 20 | 80 | | 60 |

Result:

| AP Trial Balance | GL Credit Balance of AP Liability account | Manual Difference | Explained Journals | Difference | Not Explained Difference |
|---|---|---|---|---|---|
| 40 | 20 | 20 | 20 | 20 | 0 |

Discrepancy 2:
Reverse the journal entry created by AP manually in GL. This entry is accidently not registered in the AP sub ledger.
AP Trial Balance=100−60=40 USD
GL (General Ledger) entries:

| | Liability | | Expense | | Cash | |
|---|---|---|---|---|---|---|
| | Dr | Cr | Dr | Cr | Dr | Cr |
| Invoice #1 | | 100 | 100 | | | |
| Payment #1 | 60 | | | | | 60 |
| Manual entry | 20 | | | 20 | | |
| Reverse Payment #1 entry | | 60 | | | 60 | |
| Balance | | 80 | 80 | | | |

Result:

| AP Trial Balance | GL Credit Balance of AP Liability account | Difference | Manual Journals | Reversed AP | Explained Difference | Not Explained Difference |
|---|---|---|---|---|---|---|
| 40 | 80 | −40 | 20 | −60 | −40 | 0 |

Discrepancy 3:
Use AP Liability account as Expense Account by AP Invoice.
Add invoice #2 for 50 USD for this purpose. Invoice #2 is not paid.
AP Trial Balance=100−60+50=90 USD
GL (General Ledger) entries:

| | Liability | | Expense | | Cash | |
|---|---|---|---|---|---|---|
| | Dr | Cr | Dr | Cr | Dr | Cr |
| Invoice #1 | | 100 | 100 | | | |
| Payment #1 | 60 | | | | | 60 |
| Manual entry | 20 | | | 20 | | |
| Reverse Payment #1 entry | | 60 | | | 60 | |
| Invoice #2 | 50 | 50 | | | | |
| Balance | | 80 | 80 | | | |

Result:

| AP Trial Balance | GL Credit Balance of AP Liability account | Difference | Manual Journals | Reversed AP | Wrong AP entry | Explained Difference | Not Explained Difference |
|---|---|---|---|---|---|---|---|
| 90 | 80 | 10 | 20 | −60 | 50 | 10 | 0 |

Figure 1:
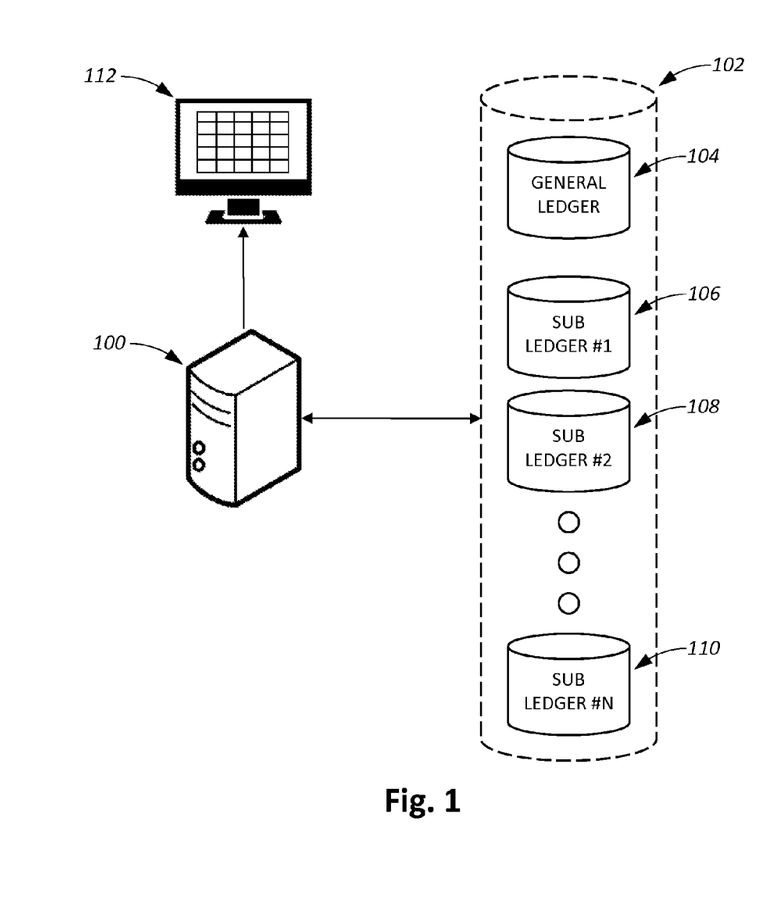
FIG. 1 shows a block diagram of a computerized system for querying, reporting and explaining discrepancies between sub ledgers and a general ledger, in accordance with an embodiment.

The present disclosure may be better understood with reference to the accompanying figures. Reference is now made to FIG. 1, which shows a block diagram of a computerized system for querying, reporting and explaining discrepancies between sub ledgers and a general ledger. The ERP (Enterprise Resource Planning) system of the organization may include a server 100, comprising at least one hardware processor, a database 102 stored on a non-transient memory, which database may include a general ledger database 104 and databases for sub ledgers 1 . . . N (106, 108 and 110 respectively), and at least one display 112. Server 100 may have access to database 102, to perform queries and retrieve information from each of the ledgers databases (general ledger database 104 and sub ledgers databases 106, 108, 110). Server 100 may perform calculations on this information, to find discrepancies between general ledger to sub ledgers, and provide a report which may be displayed on display 112.

Figure 2:
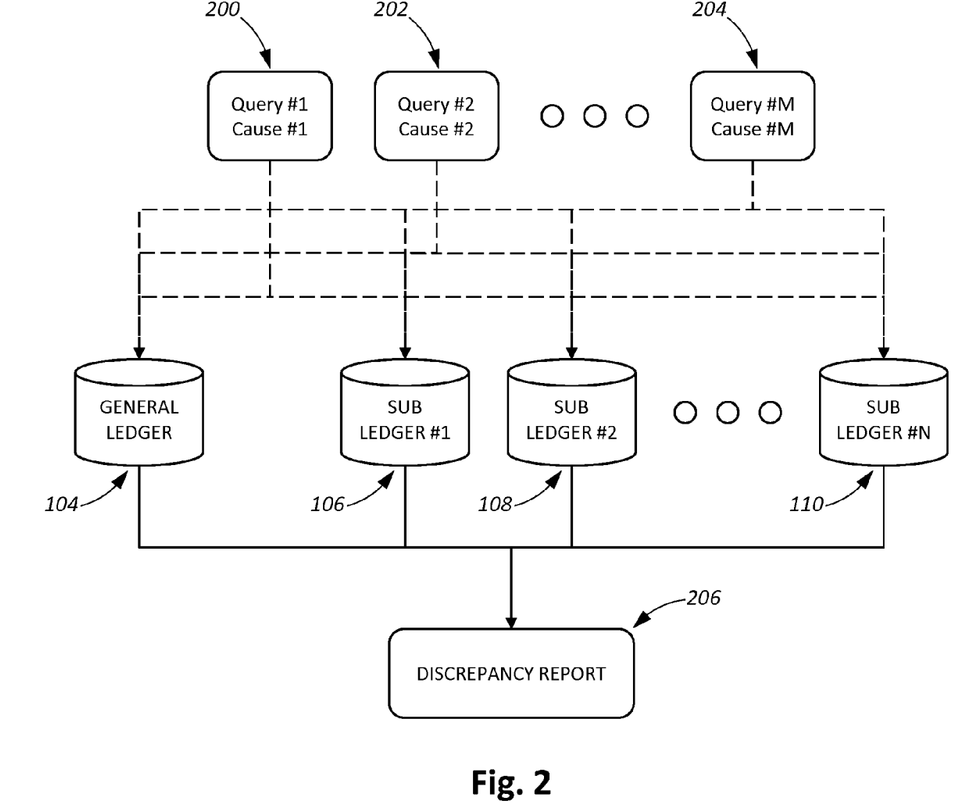
FIG. 2 shows a flowchart of a method for computerized querying, reporting and explaining discrepancies between sub ledgers and a general ledger, in accordance with an embodiment.

Reference is now made to FIG. 2, which shows a flowchart of a method for computerized querying, reporting and explaining discrepancies between sub ledgers and a general ledger. For each of the ledgers (general ledger 104 and sub ledgers 106, 108, 110), multiple causes for discrepancy may exist.

By way of example only, the causes for discrepancy in the cash management sub ledger are described in table 1:

| Cash Management | Explanation |
|---|---|
| Unreconciled Amount | Total amount of bank lines in reconciliation period not reconciled in cash management |
| Open-Previous Close | ControlTotal amount of difference between statement open balance and previous statement closing balance, for statements in reconciliation period |
| Control-Calculated Closing | Total amount of difference between statement closing balance reported by bank and statement closing balance calculated from the statement lines |
| Not Posted in GL | Total amount of transactions in reconciliation period for cash account created by subledgers (AP/AR) transferred to GL but not posted in GL |
| Not Transferred to GL | Total amount of transactions in reconciliation period for cash account created by subledgers (AP/AR) and not transferred to GL |
| Reconciled to Reversed Receipts | total amount of bank statement lines in reconciliation period, reconciled to AR receipts which were reversed lated in AR, when the way of reversal caused the reverse not to appear as transaction available for reconciliation |
| Reconciled to Stopped Lines | Total amount of bank statement lines in reconciliation period with "stopped" line type, reconciled to voided payments. |
| GL Date after Cash | Total amount of Bank Statement Lines in reconciliation period, reconciled to transactions with GL date later than reconciliation period |
| GL Date before Cash | Total amount of bank statement lines with transaction date later than reconciliation period reconciled to transactions with GL date in reconciliation period |
| Unreconciled after GL Period | Total amount of AR/AP transactions that were reconciled in reconciliation period and reversed later |
| Available GL Journals | Total amount of GL journals in reconciliation period that are still not reconciled |
| Available Cleared Transactions | Total amount of AR transactions in status cleared which are still not reconciled in reconciliation period |
| AR/AP Reversed in GL | Total amount of AR/AP transactions for cash accounts that were transferred to GL and reversed in GL |
| AR/AP Wrong Source | Total amount of AR/AP non cash transactions created for cash accounts |

By way of example only, the causes for discrepancy in the AR (Accounts Receivable) management sub ledger are described in table 2:

| AR | Explanation |
|---|---|
| Not Posted in GL | Total amount of AR transactions in reconciliation period transferred to GL but not posted in GL |
| Not Transferred to GL | Total amount of AR transactions in reconciliation period not transferred to GL |
| AR Non Open Receivables | Total amount of AR transactions that appear in GL but not in AR due to setup |
| Manual Transactions FEB- 13 | Total amount of transactions created in GL by sources different than AR or manually |
| SLA Exceptions | Total amount of AR transactions created with the reconciled account in the wrong place (for example revenue) |

By way of example only, the causes for discrepancy in the AP (Accounts Payable) management sub ledger are described in table 3:

| AP | Explanation |
|---|---|
| Not Posted in GL | Total amount of AP Transactions in reconciliation period transferred to GL but not posted in GL |
| Not Transferred to GL | Total amount of AP Transactions in reconciliation period not transferred to GL |
| Manual Transactions FEB- 13 | Total amount of transactions created in GL by source sdifferent than AP or manually |
| SLA Exceptions | Total amount of AP Transactions created with the reconciled account in the wrong place (for example Expense) |

By way of example only, the causes for discrepancy in the FA (Fixed Assets) management sub ledger are described in table 4:

| FA | Explanation |
|---|---|
| Manual Transactions to be Fixed | Total amount of transactions created in GL by sources different than FA or manually |
| Not Posted in GL | Total amount of FA Transactions in reconciliation period transferred to GL but not posted in GL |

For each cause that may be relevant to a certain ledger or sub-ledger, a database query which may correspond with that cause may be executed on that certain ledger or sub-ledger. In computerized systems (such as ERP systems) which include database(s), SQL (Structured Query Language) may be commonly used for querying. This is a language which may allow standardization of coding within these systems. A typical SQL query may comprise the following: a declaration of query, the source from which the data should be retrieved, the condition(s) for the data to be retrieved, and the order or grouping in which the data should be retrieved.

By example herein, causes 1 . . . M (200, 202 and 204 respectively) may be relevant to all ledgers, and thus, corresponding queries 200, 202 and 204 may be executed on all ledgers (104, 106, 108 and 110). In other cases, some causes may be unique only to general ledger 104, but not to sub ledgers 106, 108 and 110 (for example manual entry cause), and vice versa. Each query may scan a certain ledger for specific discrepancies defined in that query. After receiving responses from all queries, a discrepancies report 206 containing all found discrepancies may be generated. Report 206 may also contain the cause and magnitude of each discrepancy. Additionally or alternatively, report 206 may include a consolidated magnitude of all discrepancies found in sub ledgers, with reference to all discrepancies found in general ledger. The consolidated magnitude may be the sum of the absolute values of all discrepancies.

Figure 3:
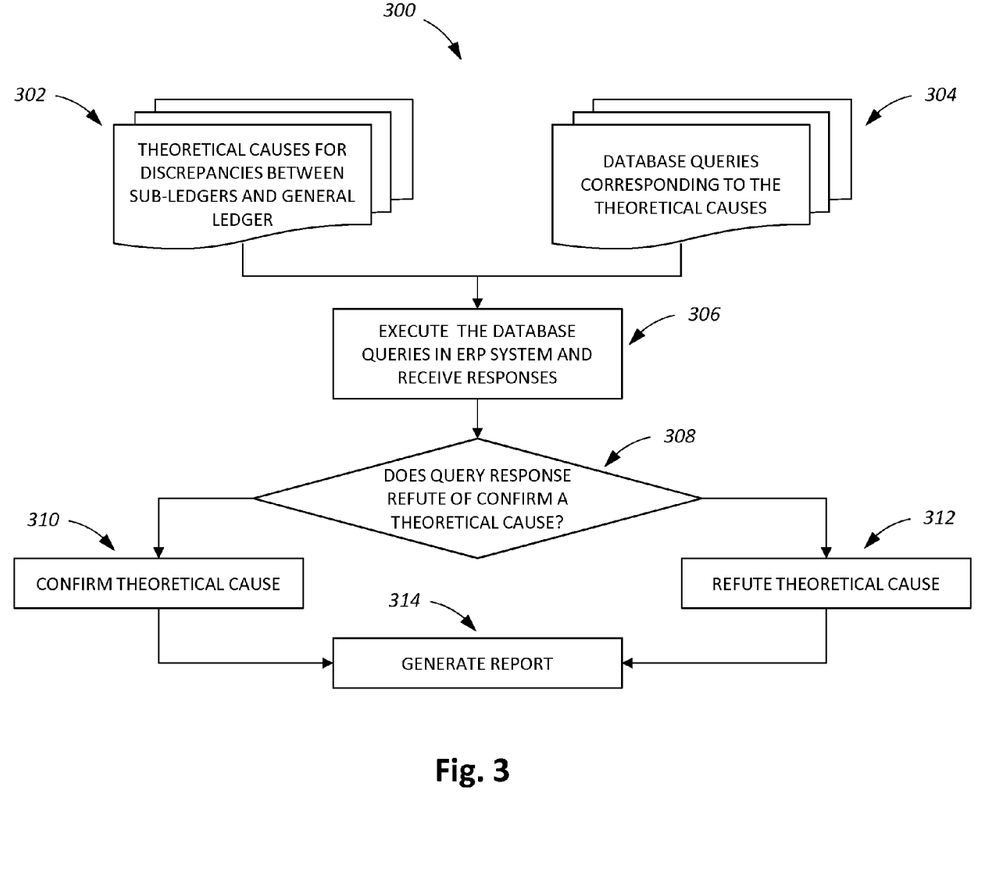
FIG. 3 shows a flowchart of a method for determining one or more causes for discrepancies in a computerized accounting system, in accordance with an embodiment.

FIG. 3 shows a flowchart of a method 300 for determining one or more causes for discrepancies in a computerized accounting system. Method 300 may be executed using one or more hardware processors.

Method 300 may utilize a set of theoretical causes for discrepancies between sub-ledgers and a general ledger 302, as well as a set of database queries corresponding to the theoretical causes 304. The correspondence may be a one-to-one correspondence between a theoretical cause of set 302 and a database query of set 304. Additionally or alternatively, the correspondence may be a one-to-many correspondence.

Sets 302 and 304 may be stored in a non-transient memory accessible by the one or more hardware processors.

In a step 306, one or more of the database queries of set 304 may be executed, for example, in a DBMS (database management system) of the ERP system. The DBMS may respond to the queries with one or more responses.

In a step 308, each of the responses may be vetted, to conclude if it confirms 310 of refutes 312 its corresponding theoretical cause. Optionally, an empty response, namely—a response which does not include any database records, is considered a response which refutes 312 its corresponding theoretical cause. In contrast, a response which includes one or more database records (each representative of a monetary transaction in the accounting system), is considered a response which confirms 310 its corresponding theoretical cause. The database records included in such confirmatory response are the ones which are the cause of the discrepancy.

In a step 314, a report may be generated and displayed. The report may include information as to confirmed theoretical causes, and optionally as to refuted theoretical causes. Optionally, the report may also include, for at least some of the confirmed theoretical causes, the magnitude of discrepancy. The magnitude may be expressed in one or more numerical values. For example, in the theoretical cause "Manual Transactions to be Fixed" of the fixed assets (FA) sub-ledger, the magnitude may be the total monetary amount of all transactions created in the GL by sources different than the FA or manually.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

EXAMPLE

The following is an example of a representative SQL query, which, in this case, may be used for confirming or refuting an AP SLA Exception, as detailed in Table 3 above. This SQL query searches the sub-ledger Accounting Transactions, and tries to find the transactions created by an AP Payables application for the AP Trial Balance account, with account class different from "Liability":

```
SELECT L.CODE_COMBINATION_ID SLA_CODE_COMBINATION_ID,
    L.ACCOUNTING_CLASS_CODE,
    L.CURRENCY_CONVERSION_DATE,
    L.CURRENCY_CONVERSION_RATE,
    L.CURRENCY_CONVERSION_TYPE,
    NVL(LK7.MEANING, L.ACCOUNTING_CLASS_CODE) ACCOUNTING_CLASS,
    L.ENTERED_DR,
    L.ENTERED_CR,
    NVL(L.ENTERED_DR, 0)-NVL(L.ENTERED_CR, 0) SLA_ENTERED_NET,
    L.ACCOUNTED_DR,
    L.ACCOUNTED_CR,
    NVL(L.ACCOUNTED_DR, 0)-NVL(L.ACCOUNTED_CR, 0) SLA_ACCOUNTED_NET,
    L.CREATED_BY,
    L.CREATION_DATE,
    L.CURRENCY_CODE,
    L.CURRENCY_CODE SLA_CURRENCY_CODE,
    L.DESCRIPTION LINE_DESCRIPTION,
    L.GL_SL_LINK_ID,
    L.GL_SL_LINK_TABLE,
    L.AE_LINE_NUM SLA_AE_LINE_NUM
    L.JGZZ_RECON_REF,
    L.PARTY_TYPE_CODE,
    L.PARTY_ID SLA_PARTY_ID,
    L.USSGL_TRANSACTION_CODE,
    L.DISPLAYED_LINE_NUMBER,
    H.COMPLETION_ACCT_SEQ_VALUE,
    H.COMPLETION_ACCT_SEQ_VERSION_ID COMPLETION_ACCT_SEQ_VER_ID,
    H.BALANCE_TYPE_CODE,
    H.BUDGET_VERSION_ID,
    H.COMPLETED_DATE,
    H.DOC_SEQUENCE_ID,
    H.DOC_SEQUENCE_VALUE,
    TO_CHAR(H.ACCOUNTING_DATE, 'DD-MON-RRRR') ACCOUNTING_DATE,
    XXRW_GLB_UTILS_PKG.DATE_TO_EXC_DATE (H.ACCOUNTING_DATE) ACCOUNTING_DATE_DSP,
    H.PERIOD_NAME,
    H.DESCRIPTION HEADER_DESCRIPTION,
    H.JE_CATEGORY_NAME,
    H.AE_HEADER_ID SLA_AE_HEADER_ID,
    H.PRODUCT_RULE_TYPE_CODE,
    H.PRODUCT_RULE_CODE,
    H.PRODUCT_RULE_VERSION PROD_RULE_VERSION,
    H.REFERENCE_DATE,
    H.CLOSE_ACCT_SEQ_VALUE,
    H.CLOSE_ACCT_SEQ_VERSION_ID CLOSE_ACCT_SEQ_VER_ID,
    H.EVENT_TYPE_CODE,
    H.ACCOUNTING_ENTRY_STATUS_CODE,
    H.ACCOUNTING_ENTRY_TYPE_CODE,
    H.GL_TRANSFER_DATE,
    H.GL_TRANSFER_STATUS_CODE,
    E.EVENT_ID SLA_EVENT_ID,
    E.APPLICATION_ID SLA_APPLICATION_ID,
    E.CREATION_DATE EVENT_CREATION_DATE,
    E.EVENT_DATE,
    E.EVENT_NUMBER,
    TE.ENTITY_ID SLA_ENTITY_ID,
    TE.ENTITY_CODE,
    TE.TRANSACTION_NUMBER,
    TE.VALUATION_METHOD,
    TE.LEGAL_ENTITY_ID,
    ET.ENTITY_CODE,
    ET.ENTITY_CODE SLA_ENTITY_CODE,
    ET.EVENT_CLASS_CODE,
    ET.EVENT_CLASS_CODE SLA_EVENT_CLASS_CODE,
    ET.NAME EVENT_TYPE,
    EC.NAME EVENT_CLASS,
    L.CODE_COMBINATION_ID SLATB_CODE_COMBINATION_ID,
    L.CURRENCY_CODE SLATB_CURRENCY_CODE,
    L.AE_LINE_NUM SLATB_AE_LINE_NUM,
    L.PARTY_ID SLATB_PARTY_ID,
    DECODE(L.PARTY_TYPE_CODE, 'S', L.PARTY_ID) SUPPLIER_ID,
    DECODE(L.PARTY_TYPE_CODE, 'S', L.PARTY_SITE_ID) SUPPLIER_SITE_ID,
```

TE.ENTITY_ID SLATB_ENTITY_ID,
ET.ENTITY_CODE SLATB_ENTITY_CODE,
ET.EVENT_CLASS_CODE SLATB_EVENT_CLASS_CODE,
E.EVENT_ID SLATB_EVENT_ID,
H.AE_HEADER_ID SLATB_AE_HEADER_ID,
E.APPLICATION_ID SLATB_APPLICATION_ID,
PV.VENDOR_NAME PARTNER_NAME,
PV.SEGMENT1 PARTNER_NUM
FROM XLA.XLA_AE_HEADERS H,
  XLA.XLA_AE_LINES L,
  XLA.XLA_EVENTS E,
  XLA.XLA_TRANSACTION_ENTITIES TE,
  XLA_EVENT_TYPES_VL ET,
  XLA_EVENT_CLASSES_VL EC,
  XLA_LOOKUPS LK7,
  PO_VENDORS PV
WHERE H.BALANCE_TYPE_CODE='A'
  AND H.ACCOUNTING_ENTRY_STATUS_CODE < > 'D'
  AND EC.APPLICATION_ID=ET.APPLICATION_ID
  AND EC.ENTITY_CODE=ET.ENTITY_CODE
  AND EC.EVENT_CLASS_CODE=ET.EVENT_CLASS_CODE
  AND ET.APPLICATION_ID=H.APPLICATION_ID
  AND ET.ENTITY_CODE=TE.ENTITY_CODE
  AND E.ENTITY_ID=TE.ENTITY_ID
  AND E.APPLICATION_ID=TE.APPLICATION_ID
  AND E.APPLICATION_ID=ET.APPLICATION_ID
  AND E.EVENT_TYPE_CODE=ET.EVENT_TYPE_CODE
  AND ET.EVENT_TYPE_CODE=H.EVENT_TYPE_CODE
  AND ET.APPLICATION_ID=TE.APPLICATION_ID
  AND TE.APPLICATION_ID=H.APPLICATION_ID
  AND TE.ENTITY_ID=H.ENTITY_ID
  AND E.EVENT_ID=H.EVENT_ID
  AND E.APPLICATION_ID=H.APPLICATION_ID
  AND H.AE_HEADER_ID=L.AE_HEADER_ID
  AND H.APPLICATION_ID=L.APPLICATION_ID
  AND LK7.LOOKUP_CODE(+)=L.ACCOUNTING_CLASS_CODE
  AND LK7.LOOKUP_TYPE(+)='XLA_ACCOUNTING_CLASS'
  AND NVL(NVL(ACCOUNTED_CR, ACCOUNTED_DR), 0)< >0
  AND PV.VENDOR_ID(+)=DECODE(L.PARTY_TYPE_ CODE, 'S', L.PARTY_ID, -1)
  AND H.APPLICATION_ID=200
  AND H.LEDGER_ID=:GLD_LEDGER_ID
  AND L.LEDGER_ID=:GLD_LEDGER_ID
  AND H.ACCOUNTING_DATE between
  TO_DATE(:GLD_BOOK_START_PERIOD_DATE, 'DD-MON-RRRR' AND
  TO_DATE(:GLD_PERIOD_END_DATE, 'DD-MON-RRRR')
  AND L.ACCOUNTING_DATE between
  TO_DATE(:GLD_BOOK_START_PERIOD_DATE, 'DD-MON-RRRR') AND
  TO_DATE(:GLD_PERIOD_END_DATE, 'DD-MON-RRRR')
  AND L.CODE_COMBINATION_ID=:SOURCE_CODE_COMBINATION_ID
  AND L.CURRENCY_CODE=:SOURCE_CURRENCY_ CODE
  AND L.ACCOUNTING_CLASS_CODE < >'LIABILITY'
  ORDER BY H.GL_TRANSFER_STATUS_CODE,
  L.ACCOUNTING_CLASS_CODE,
  ACCOUNTING_DATE_DSP,
  TE.TRANSACTION_NUMBER This SQL query was run in the Oracle ERP system by Oracle Corp. The result of this SQL query was, in this example, a table detailing six transactions (given in rows), each provided with data across multiple columns listed in the SQL query. These six transactions are evidence that the AP SLA Exception discrepancy has been confirmed, and that these transactions are the cause for this discrepancy. To generalize this example, if a response to an SQL query includes one or more transactions, then the existence of the discrepancy associated with that query is confirmed, and the one or more transactions are the ones responsible for the discrepancy.

Figure 4:
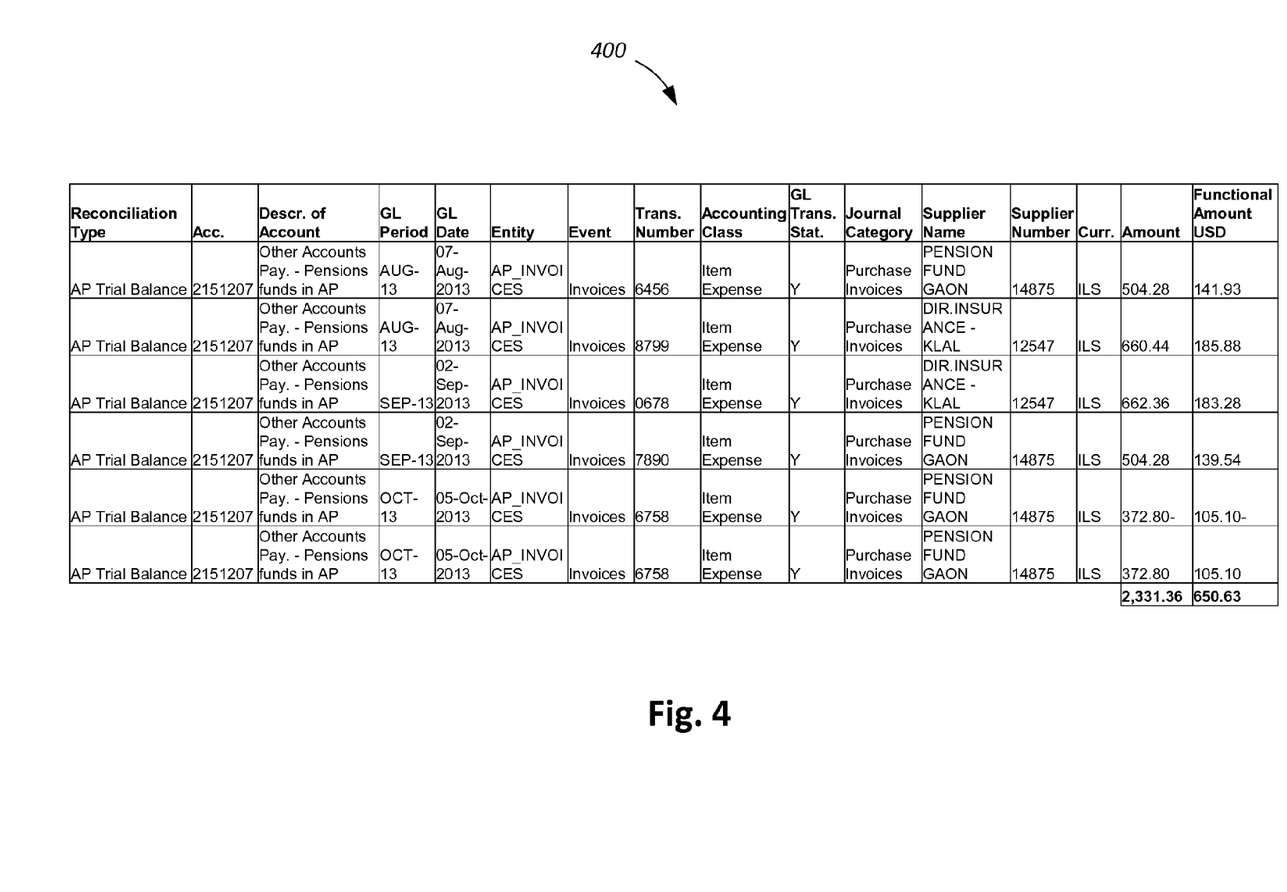
FIG. 4 shows a user-friendly report which summarizes exemplary SQL (Structured Query Language) query results.

The raw result of this particular SQL query is not included here, for reasons of brevity, as it includes a few dozen data fields (columns) for each of the six transactions. However, a more user-friendly report 400 which summarizes the SQL query results is shown in FIG. 4. Each line in report 400 relates to one of the six transactions. For each transaction, significant information, such as transaction number, supplier number, amount, etc. may be shown, to aid a user in understanding what this transaction entails. The "amount" and "functional amount USD", in this example, show the magnitude of each discrepancy. At the bottom right of report 400, these magnitudes are summarized. These transactions are, essentially, the explanation of the discrepancy found.

Notably, even though the $5^{th}$ and $6^{th}$ transactions cancel each other out (being directed to the same transaction and to inverse amounts), they are nonetheless shown in report 400, so that the user can correct whatever needs correction in the accounting system. In many of today's reconciliation processes, such transactions with inverse amounts would remain undiscovered.

What is claimed is:

1. A method determining one or more causes for discrepancies in a computerized accounting system, the method comprising using at least one hardware processor for:
providing a set of theoretical causes for discrepancies between sub-ledgers of an ERP (Enterprise Resource Planning) system and a general ledger of the ERP system;
providing a set of database queries corresponding to the theoretical causes in the set of theoretical causes;
executing the database queries of the a set of database queries in the ERP system;
receiving a set of responses to the database queries; and
based on the set of responses, refuting or confirming each of the theoretical causes of the set of theoretical causes.

2. The method according to claim 1, wherein said set of theoretical causes for discrepancies comprises sub-sets of theoretical causes of discrepancies unique to said general ledger, and said executing of the database queries of the set of database queries comprises executing sub-sets of database queries unique to said general ledger.

3. The method according to claim 1, wherein said set of theoretical causes of discrepancies comprises sub-sets of theoretical causes of discrepancies unique to each of said sub-ledgers, and said executing of the database queries of the set of database queries comprises executing sub-sets of database queries unique to each of said sub ledgers.

4. The method according to claim 1, further comprising using said at least one hardware processor for generating, based on the set of responses, a report comprising confirmed ones of said causes, each represented by one or more transactions comprised in the set of responses to the database queries.

5. The method according to claim 4, wherein said report further comprises a magnitude of discrepancy for each of said confirmed ones of said causes.

6. The method according to claim 5, wherein the magnitude of discrepancy is expressed by a monetary amount.

7. The method according to claim 4, wherein said report further comprises a consolidated magnitude of all of said discrepancies.

8. A computer program product for determining one or more causes for discrepancies in a computerized accounting system, the computer program product comprising a non-transitory computer-readable storage medium having program code embodied therewith, the program code executable by at least one hardware processor to:
provide a set of theoretical causes for discrepancies between sub-ledgers of an ERP (Enterprise Resource Planning) system and a general ledger of the ERP system;
provide a set of database queries corresponding to the theoretical causes in the set of theoretical causes;
execute the database queries of the a set of database queries in the ERP system;
receive a set of responses to the database queries; and
based on the set of responses, refute or confirm each of the theoretical causes of the set of theoretical causes.

9. The computer program product according to claim 8, wherein said set of theoretical causes of discrepancies comprises sub-sets of theoretical causes of discrepancies unique to said general ledger, and said executing of the database queries of the set of database queries comprises executing sub-sets of database queries unique to said general ledger.

10. The computer program product according to claim 8, wherein said set of theoretical causes of discrepancies comprises sub-sets of theoretical causes of discrepancies unique to each of said sub-ledgers, and said executing of the database queries of the set of database queries comprises executing sub-sets of database queries unique to each of said sub ledgers.

11. The computer program product according to claim 8, wherein said program code is further executable by said at least one hardware processor to generate, based on the set of responses, a report comprising confirmed ones of said causes, each represented by one or more transactions comprised in the set of responses to the database queries.

12. The computer program product according to claim 11, wherein said report further comprises a magnitude of discrepancy for each of said confirmed ones of said causes.

13. The computer program product according to claim 12, wherein the magnitude of discrepancy is expressed by a monetary amount.

14. The computer program product according to claim 11, wherein said report further comprises a consolidated magnitude of all of said discrepancies.

15. An apparatus comprising:
a non-transient memory having stored thereon:
(a) a set of theoretical causes for discrepancies between sub-ledgers of an ERP (Enterprise Resource Planning) system and a general ledger of the ERP system, and
(b) a set of database queries corresponding to the theoretical causes in the set of theoretical causes; and
a hardware processor configured to:
(c) execute the database queries of the a set of database queries in the ERP system,
(d) receive a set of responses to the database queries, and
(e) based on the set of responses, refute or confirm each of the theoretical causes of the set of theoretical causes.

16. The apparatus according to claim 15, wherein said set of theoretical causes of discrepancies comprises sub-sets of theoretical causes of discrepancies unique to said general ledger, and said executing of the database queries of the set of database queries comprises executing sub-sets of database queries unique to said general ledger.

17. The apparatus according to claim 15, wherein said set of theoretical causes of discrepancies comprises sub-sets of theoretical causes of discrepancies unique to each of said sub-ledgers, and said executing of the database queries of the set of database queries comprises executing sub-sets of database queries unique to each of said sub ledgers.

18. The apparatus according to claim 15, wherein said hardware processor configured to generate, based on the set of responses, a report comprising confirmed ones of said causes, each represented by one or more transactions comprised in the set of responses to the database queries.

19. The apparatus according to claim 18, wherein said report further comprises a magnitude of discrepancy for each of said confirmed ones of said causes.

20. The computer program product according to claim 18, wherein said report further comprises a consolidated magnitude of all of said discrepancies.

\* \* \* \* \*